Patented May 23, 1950

2,508,501

UNITED STATES PATENT OFFICE 2,508,501

SOLDERING FLUX

Armand Di Giulio, Detroit, Mich.

No Drawing. Application October 6, 1947,
Serial No. 778,279

5 Claims. (Cl. 148—24)

This invention is concerned with compositions of matter and more specifically fluxing materials, suitable for tinning stampings and other metal bodies by means of solders. Tinning is understood to be the preliminary operation of covering metallic surfaces with thin layers of soldering material, upon which additional solder may be readily applied for increased strength or to bring the surfaces to predetermined shapes. As is well known, the tinning of metallic surfaces requires that such surfaces be entirely free from dirt, oxides and other interfering coatings. For this reason, various fluxing agents have been used, but thus far, fluxes have been designed primarily for use with solder in bar, wire, or molten form.

Solder in powdered and granulated form is now used quite extensively, lending itself particularly to numerous operations, as for example, the filling in of dents and other depressions in automotive or other sheet metal bodies. Obviously, powdered or granulated solder may be more readily fused than solder in bar or other mass form. Present fluxes have proven unsatisfactory for use with powdered or granulated solder, and I have discovered that this is due to their failure to properly wet the metallic particles or granules. Further, on application of heat to effect fusion of the solder, present fluxes are known to leave undesirable residues detrimental to subsequent finishing operations. A further objection to use of ordinary fluxes lies in their failure to facilitate the spreading of fine solder particles into small openings, such failure resulting in untinned areas and weak joints. It is to be understood in this connection that in using powdered solder for tinning, the solder, mixed with a suitable percentage of flux, is usually spread upon the surface to be tinned, heat then being applied, as for example, by a blow torch, to effect fusion of the solder. Preliminary to fusion therefore, it is desirable to introduce both the flux and solder particles into all crevices or cracks wherein tinning is essential.

I have found that to obtain satisfactory results in all the common uses of powdered and granulated solder, the flux should be a liquid possessing:

(1) The ability to remove dirt and metallic oxides and prevent the formation of such oxides upon fusion of the solder
(2) The ability to wet the particles or granules of solder as well as metallic work surfaces
(3) The ability to hold particles of solder in suspension
(4) Stability
(5) Low surface tension
(6) Ability to form emulsions with oily films and
(7) Great spreading and penetrating power I have found that the above-listed flux requirements are met when to zinc chloride is added a suitable amount of certain wetting or surface active agents in the nature of organic sodium compounds. Wetting agents suited to this purpose are as follows:

(a) Sodium lauryl sulphate
(b) Sodium alkyl aryl sulphonate
(c) A combination of the salts (a) and (b)

The most effective flux for my purpose has the following composition:

| | Per cent by weight |
|---|---|
| Zinc chloride | 90–94 |
| Sodium lauryl sulphate | 5–9 |
| Sodium alkyl aryl sulphonate | 1–5 |

In employing the preceding formula, the best results are found to accrue from use of equal weights of the two sodium salts. Fluxes materially superior to those heretofore available may also be formed by mixing either one of the identified sodium salts in proper proportions with zinc chloride, such proportions being below indicated:

| | Per cent by weight |
|---|---|
| Zinc chloride | 80–98 |
| Sodium lauryl sulphate | 2–20 |
| | |
| Zinc chloride | 80–98 |
| Sodium alkyl aryl sulphonate | 2–20 |

The dry flux, preferably in powder form, is dissolved in water and to the solution is added any commercial lead base solder in powder form. For best results I have found that the dry flux should be mixed with one to three parts of water by volume. After the flux is dissolved, powdered lead base solder is added in the volumetric proportion of one part of dry flux to two to three parts of solder.

A very important characteristic of a fluxing solution formed as above described and incorporating any of the three stated formulae, is an ability to hold powdered solder in a stable suspension. This is to say, when a suitable quantity of the solder is added to the solution and is distributed, as by stirring or shaking, substantially uniformly throughout the solution, such distribution will continue almost indefinitely. It is to be noted that this ability to hold the solder in substantially fixed suspension is lacking in a mere solution of zinc chloride and requires the presence of one or both of the specified wetting agents. Importance of maintaining the solder in suspension lies, of course, in assuring that the solder-flux mixture will have a constant consistency of the required proportions, when brushed or wiped upon a surface requiring tinning.

Respecting the use of solder in granulated form, it will be appreciated that only rather fine granules can be held in such suspension as is feasible with powdered solder. In other discussed respects, however, my improved fluxes are desirable for use with granulated solder.

What I claim is:

1. A soldering and fluxing mixture composed of zinc chloride, a wetting agent selected from the group consisting of sodium lauryl sulphate and sodium alkyl aryl sulphonate, water wherein said salts are in solution, and powdered solder held by said solution in stable suspension.

2. A soldering and fluxing mixture composed of zinc chloride, sodium lauryl sulphate, water wherein said salts are in solution, and powdered solder held by said solution in stable suspension.

3. A soldering and fluxing mixture composed of zinc chloride, sodium alkyl aryl sulphonate, water wherein said salts are in solution, and powdered solder held by said solution in stable suspension.

4. A method of combining a solder and flux consisting in forming a solution in water composed of zinc chloride and a wetting agent selected from the group consisting of sodium lauryl sulphate and sodium alkyl aryl sulphonate, and suspending powdered solder in said solution.

5. A soldering and fluxing mixture consisting of powdered solder stably suspended in a solution of a flux in water, the flux being composed of 90 to 94 per cent by weight of zinc chloride and 6 to 10 per cent by weight of sodium lauryl sulphate and sodium alkyl aryl sulphonate, in substantially equal weights, one part of said flux by volume being dissolved in one to three parts by volume of water, the flux being volumetrically proportioned to the solder in a ratio of one part of flux to two to three parts of solder.

ARMAND DI GIULIO.

REFERENCES CITED

The following references are of record in the file of this patent:

UNITED STATES PATENTS

| Number | Name | Date |
|---|---|---|
| 952,762 | Snowden | Mar. 23, 1910 |
| 1,785,147 | Schweitzer | Dec. 16, 1930 |
| 1,785,155 | Taylor | Dec. 16, 1930 |
| 1,974,436 | Schweitzer | Sept. 25, 1934 |